United States Patent
Morris

(10) Patent No.: US 12,213,408 B2
(45) Date of Patent: Feb. 4, 2025

(54) COMBINE HARVESTER OPERATION BASED ON WINDROW DATA STREAM

(71) Applicant: DEERE & COMPANY, Moline, IL (US)

(72) Inventor: Craig S. Morris, Galesburg, IL (US)

(73) Assignee: DEERE & COMPANY, Moline, IL (US)

( * ) Notice: Subject to any disclaimer, the term of this patent is extended or adjusted under 35 U.S.C. 154(b) by 221 days.

(21) Appl. No.: 17/553,430

(22) Filed: Dec. 16, 2021

(65) Prior Publication Data

US 2023/0142286 A1   May 11, 2023

Related U.S. Application Data

(60) Provisional application No. 63/277,779, filed on Nov. 10, 2021.

(51) Int. Cl.
*A01D 41/127*  (2006.01)
*G05D 1/00*  (2006.01)

(52) U.S. Cl.
CPC ..... *A01D 41/1278* (2013.01); *A01D 41/1271* (2013.01); *G05D 1/0219* (2013.01)

(58) Field of Classification Search
CPC ............ A01D 41/1278; A01D 41/1274; A01D 41/1271; A01D 41/127; G05D 1/0219; G05D 1/0287; G05D 2201/0201; G05D 1/0212; G05D 1/0276; G05D 1/0278
See application file for complete search history.

(56) References Cited

U.S. PATENT DOCUMENTS

| | | | |
|---|---|---|---|
| 7,400,957 B2 | 7/2008 | Hofer et al. | |
| 8,234,033 B2* | 7/2012 | Brubaker | G05D 1/0278 701/40 |
| 8,433,483 B2 | 4/2013 | Han et al. | |
| 2007/0021913 A1* | 1/2007 | Heiniger | G05D 1/027 701/412 |
| 2007/0233374 A1* | 10/2007 | Diekhans | A01B 69/008 701/50 |
| 2008/0289308 A1 | 11/2008 | Brubaker | |

(Continued)

OTHER PUBLICATIONS

My Agro, Canola harvest 2017 (picking up swath), Canada. (4K video). My Agro, Uploaded May 31, 2018, Retrieved from the internet Mar. 2024, URL: <https://www.youtube.com/watch?v=JJYOrw8YL5Q> (Year: 2018).*

(Continued)

*Primary Examiner* — Jason Holloway
*Assistant Examiner* — Benjamin J Brosh

(57) ABSTRACT

Systems and methods for providing machine guidance to a combine harvester for collecting windrowed crops from a field. An input data stream includes a chronologically ordered series of location points and other operational data from the windrower. A centerline of each swath in the field is determined based on the plurality of data points. Guidance information to be used by the combine harvester is then generated based at least in part on the determined centerline of the first swath and other information derived from the input data stream. The guidance information (or path plan) may be used, for example, for manual, autonomous, or semi-autonomous operation of the combine harvester.

20 Claims, 5 Drawing Sheets

(56) References Cited

U.S. PATENT DOCUMENTS

| | | | | |
|---|---|---|---|---|
| 2011/0160961 A1* | 6/2011 | Wollenhaupt | ...... | A01D 41/1278 |
| | | | | 701/41 |
| 2013/0197767 A1* | 8/2013 | Lenz | .................... | A01B 79/005 |
| | | | | 701/50 |
| 2015/0134175 A1* | 5/2015 | Derscheid | ............ | G05D 1/0278 |
| | | | | 701/23 |
| 2017/0060134 A1* | 3/2017 | Buhler | ................. | A01B 79/005 |
| 2020/0174491 A1* | 6/2020 | Boydens | ................ | G06Q 50/02 |
| 2020/0200894 A1 | 6/2020 | Boydens et al. | | |
| 2021/0026362 A1* | 1/2021 | Wilson | ................... | B60K 35/22 |
| 2021/0195827 A1* | 7/2021 | Zhou | .................... | A01B 79/005 |
| 2021/0360857 A1* | 11/2021 | Steidinger | .............. | A01D 82/02 |
| 2022/0201921 A1* | 6/2022 | Sasamoto | ............ | G05D 1/0274 |
| 2022/0382290 A1* | 12/2022 | Blume | ................. | G05D 1/0219 |

OTHER PUBLICATIONS

New Holland, Pickup Heads, NPL Date Oct. 30, 2020, Retrieved from internet Mar. 2024, URL: <https://web.archive.org/web/20201030113456/https://agriculture.newholland.com/apac/en/equipment/products/combine-harvester/pick-up-heads/detail/790cp-pick-up-head> (Year: 2020).*

Merriam Webster, Definitions for "swath" and "windrow", Retrieved from internet Mar. 2024, URL: <https://www.merriam-webster.com/dictionary/swath> and <https://www.merriam-webster.com/dictionary/windrow> (Year: 2009).*

"Driver Assistance System for Harvesting Vehicles"; website—https://sickusablog.com/driver-assistance-system-for-harvesting-vehicles/.

* cited by examiner

COMBINE HARVESTER OPERATION BASED ON WINDROW DATA STREAM

CROSS REFERENCE TO RELATED APPLICATIONS

This application claims the benefit of U.S. Provisional Patent Application No. 63/277,779, filed Nov. 10, 2021, entitled "COMBINE HARVESTER OPERATION BASED ON WINDROW DATA STREAM," the entire contents of which are hereby incorporated herein by reference.

BACKGROUND

A windrower (or a "swather") is a machine that cuts crops in a field and forms them into a windrow (or "swath"). The windrowed crops are then collected from the field by a combine harvester or other farm machine.

SUMMARY

In one embodiment, the invention provides a system for providing machine guidance to a combine harvester for a harvesting operation. The system includes an electronic controller configured to receive an input data stream from a windrower including a chronologically ordered series of location points each indicative of a location of the windrower at different times during the performance of a windrowing operation in a field. A plurality of data points from the input data stream are identified as corresponding to a first swath of crops cut by the windrower and left in the field during the windrowing operation and a centerline of the first swath is determined based on the plurality of data points. Guidance information to be used by the combine harvester during the harvesting operation is then generated based at least in part on the determined centerline of the first swath. In some implementations, the input data stream includes other operation data of the windrower during the windrowing operation including, for example, a chronologically ordered series of ground speed values, cutter bar lift values, and cutter bar speed values of the windrower.

In some implementations, the guidance information is generated in the form of a path plan to be followed by the combine harvester while harvesting the crops in the first swath. In some implementations, the guidance information is used to assist an operator of the combine harvester during manual operation of the combine harvester. In some implementations, the guidance information is used to facilitate autonomous or semi-autonomous operation of the combine harvester.

In another embodiment the invention provides a method of providing machine guidance to a combine harvester for a harvesting operation. An input data stream is received by an electronic controller from a windrower. The input data stream includes a chronologically ordered series of location points each indicative of a location of the windrower at different times during the performance of a windrowing operation in a field. A plurality of data points from the input data stream are identified as corresponding to a first swath of crops cut by the windrower and left in the field during the windrowing operation and a centerline of the first swath is determined based on the plurality of data points. Guidance information to be used by the combine harvester during the harvesting operation is then generated based at least in part on the determined centerline of the first swath.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
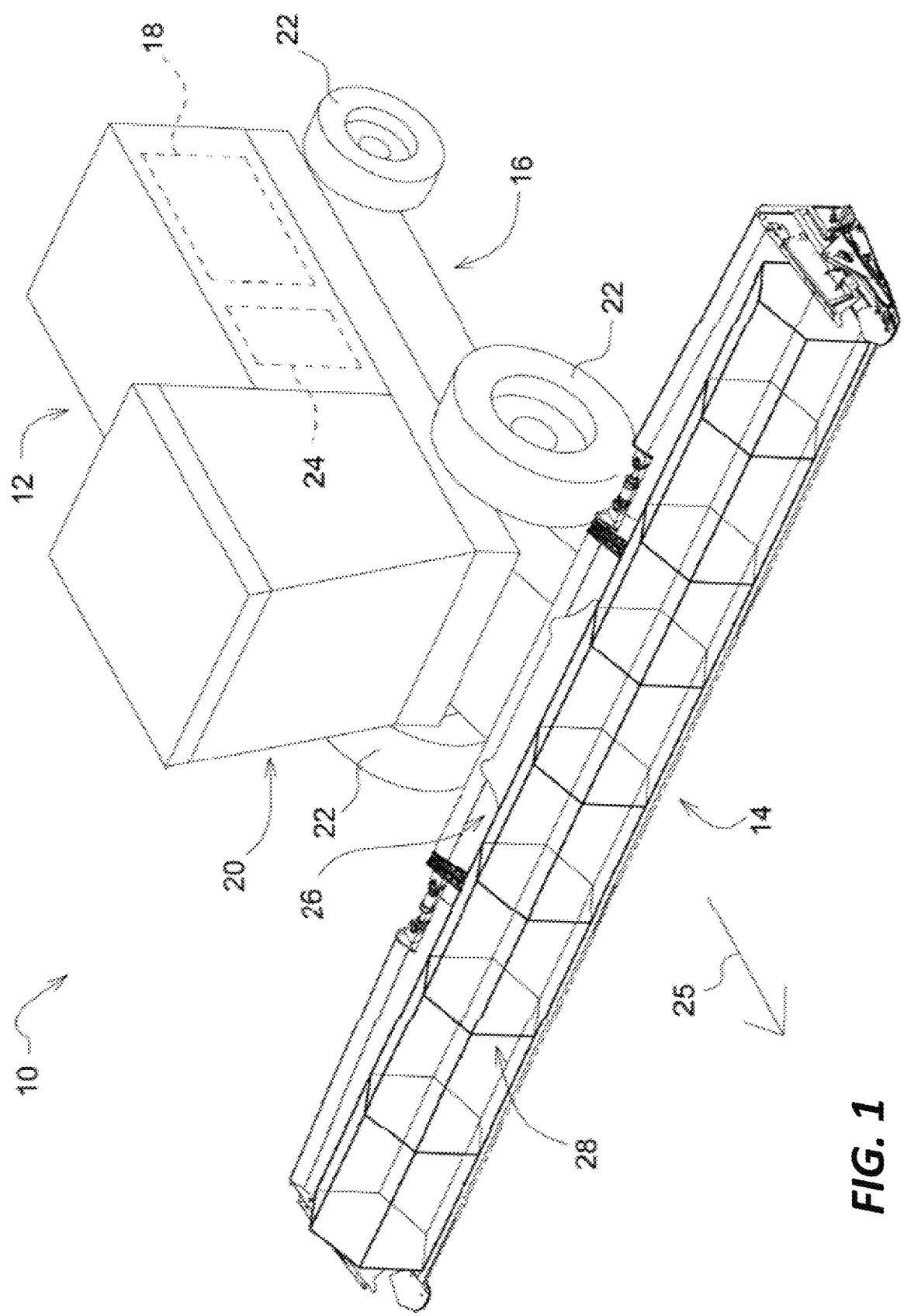
FIG. 1 is a perspective view of a windrower.

FIG. 1 illustrates an example of a self-propelled windrower 10. The windrower 10 includes a tractor 12 and a work implement such as, for example, a header 14 coupled to the tractor 12. In the example of FIG. 1, the header 14 is configured to cut crops in a field (e.g., hay, small grain crops, etc.) and to leave the cut crop in swaths (or "windrows") in the field to dry. The tractor 12 includes a chassis 16, a prime mover 18, and a control system 24. The prime mover 18 is configured to move the tractor 12 in a direction of travel 25 via the ground engaging devices 22. In the example of FIG. 1, the ground engaging devices 22 are wheels, but tracks or other suitable ground engaging devices can be utilized in other implementations. The chassis 16 supports the prime mover 18 and the control system 24. The prime mover 18 can include an engine (e.g., a diesel combustion engine) and the control system 24 can include a vehicle control unit (VCU).

The windrower 10 also includes an operator cab 20 positioned on the tractor 12. In some implementations, an operator of the windrower 10 sits within the operator cab 20 while operating the windrower 10. Accordingly, in some implementations, operator controls (not pictured) are positioned within the operator cab 20 and may include, for example, one or more of a steering wheel, control levers, joysticks, control pedals, control buttons, and other input devices. The operator controls are configured to allow the operator to control or alter the operation of the windrower 10 (e.g., to control movement of the tractor 12 and/or operation of the different components of the header 14) by actuating or adjusting one or more of the operator controls. One or more output devices may also be positioned within the operator cab 20 for communicating information to the operator of the windrower 10 and may include, for example, one or more of a display screen, indicator lights, and audio indicators.

In the example of FIG. 1, the header 14 includes a frame 26 and a cutter bar 28 coupled to the frame 26 and operably coupled to the prime mover 18. The prime mover 18 powers the cutter bar 28 to perform a cutting operation to cut crops in the field (e.g., hay, small grain crops, etc.). The header 14 is moveably connected to the chassis 16 by one or more arms that are each pivotably coupled to the chassis 16 and/or pivotably coupled to the header 14. The header 14 is further coupled to the chassis 16 by a plurality of actuators (not pictured). The actuators are controllably operated to adjust a position and orientation of the header 14 relative to the chassis 16. In some implementations, the actuators may include, for example, hydraulic cylinders, pneumatic cylinders, electric motorized actuators, mechanical spring assemblies, and/or other actuators. In some implementations, the actuators of the windrower 10 includes a tilt cylinder actuator, one or more float cylinder actuators, and a lift cylinder actuator.

In some implementations, the tilt cylinder is configured as a single double-acting hydraulic tilt cylinder that extends or retracts to adjust a tilt angle of the cutter bar 28 relative to a ground surface on which the windrower 10 is positioned (e.g., the ground surface of a field). By controllably adjusting the tilt cylinder, the windrower 10 makes refinements in a cut height of the crop being cut. Specifically, actuation of the tilt cylinder causes the cutter bar 28 to pivot relative to the arms coupling the header 14 to the tractor 12 thereby raising or lowering the height of the cutter bar 28.

In some implementations, the float cylinders are configured as single-acting hydraulic float cylinders that connect the chassis 16 of the tractor 12 to the arms (i.e., the arms coupling the header 14 to the tractor 12). The float cylinders at least partially support a weight of the header 14 and actuation of the float cylinders cause the arms to pivot relative to the chassis 16. By operating the float cylinders, the windrower 10 causes the header 14 to follow the ground surface over changing terrain. In some implementations, the lift cylinder is a separate component from the float cylinders and is configured to extend and/or retract to lower or raise the header 14 relative to the ground surface.

As the windrower 10 is operated in a field, the steering of the tractor 12 may be controllably adjusted to navigate the field. Also, the ground speed of the tractor 12 may be controllably adjusted to navigate the field and, in some implementations, the adjust for variations in crop density. For example, an operator may reduce the ground speed of the tractor 12 in areas with a high density of crops to ensure that the crops are properly cut and, conversely, may increase the grounds speed of the tractor 12 in areas with a relatively low density of crops. The actuators may also be operated (either automatically by the control system or manually by the operator of the windrower) to adjust the position and/or orientation of the cutter bar 28.

Figure 3:
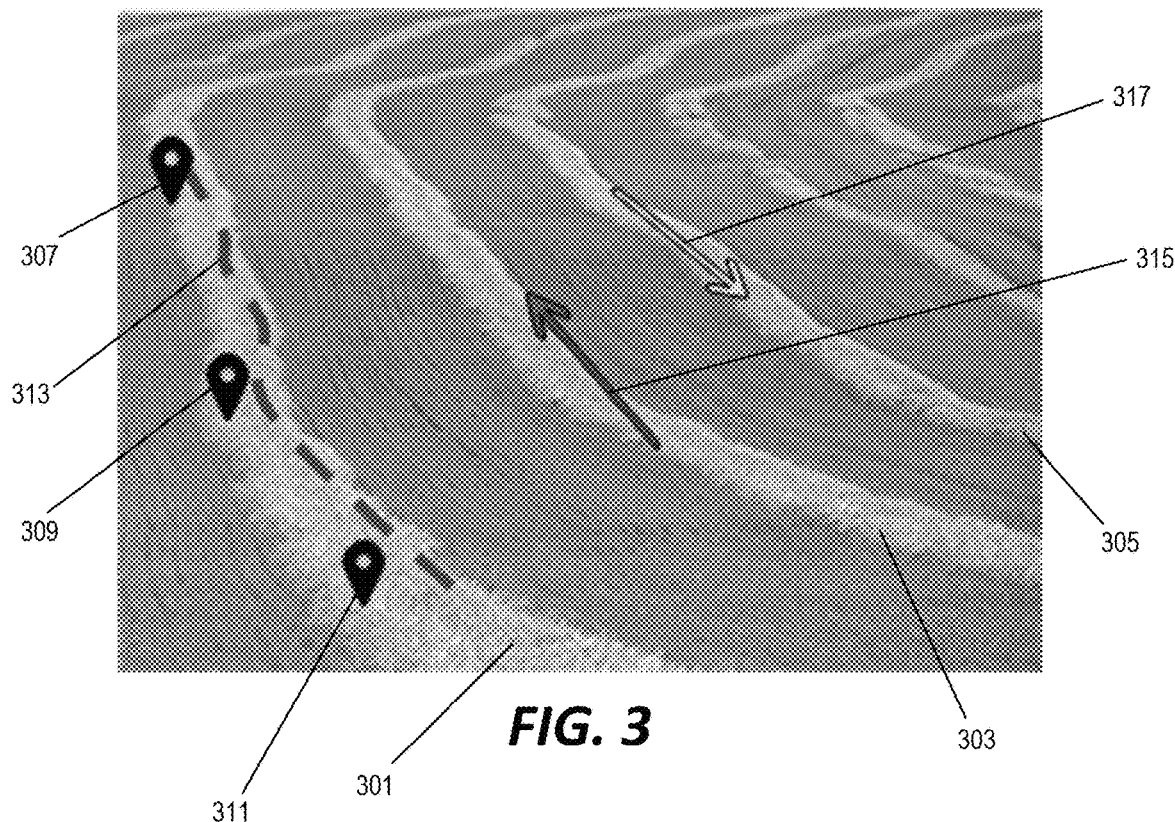
FIG. 3 is a perspective view of a field including multiple swaths of crop cut by the windrower of FIG. 1.

As the windrower 10 moves through the field, the cut crops are deposited in rows or swaths (called "windrows") in the field (see, e.g., FIG. 3 below). Each swatch generally follows a path travelled by the windrower 10 and, in some implementation, the position of the swath (i.e., a centerline of the swath) generally aligns with a known position relative the windrower 10. For example, in some implementations, the centerline of the swath of crops generally aligns with a centerline of the header 14. In some implementations, the cut crops are left to dry in the field before they are collected by a combine harvester (not pictured). In some implementations, the combine harvester collects the crops by generally following each swath (e.g., so that a center point of the path followed by the combine harvester generally aligns with a centerline of each swath).

Additionally, in some implementations, the combine harvester may perform better if the crops are fed into the combine harvester in a preferred direction. In some implementations, the direction travelled by the windrower 10 while cutting the crop impacts the direction/orientation in which the cut crops lay in the field and, therefore, in some implementations, it is preferable for the combine harvester to move in a particular direction relative to the forward direction 25 of the windrower 10. For example, in some situations/implementations it may be preferable for the forward direction of the combine harvester to be same as the forward direction 25 of the windrower 10; in other situations/implementations, it may be preferable for the forward direction of the combine harvester to be opposite the forward direction 25 of the windrower 10; and, in still other situations/implementations, it may be preferable for the forward direction of the combine harvester to be at an angle (e.g., perpendicular) to the forward direction 25 of the windrower 10.

Figure 2:
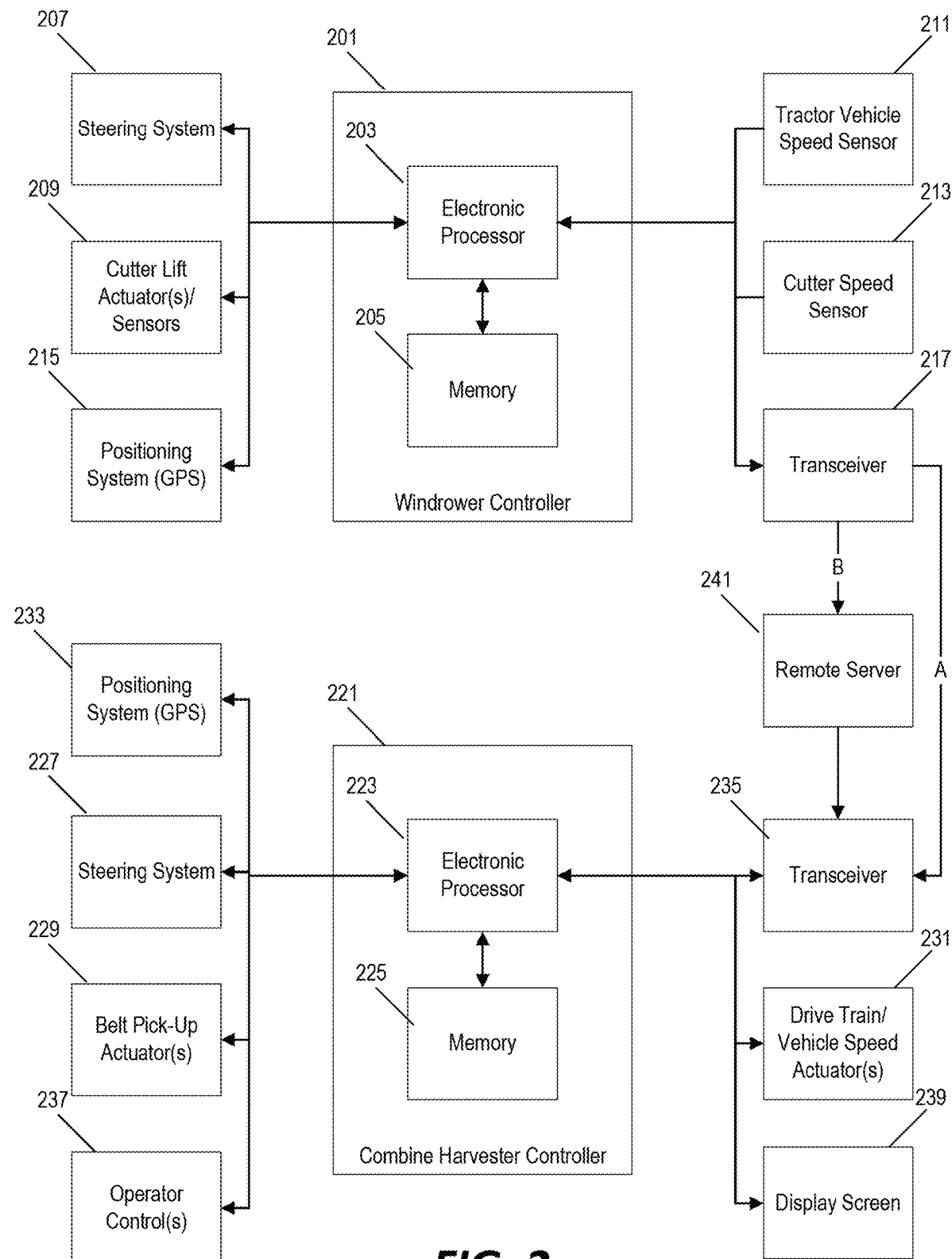
FIG. 2 is a block diagram of a control system for the windrower of FIG. 1 in communication with a control system for a combine harvester.

FIG. 2 illustrates an example of a control system for a windrower (e.g., control system 24 of the windrower 10) and a control system for a combine harvester. A windrower controller 201 includes an electronic processor 203 and a non-transitory computer-readable memory 205. The memory 205 is communicatively coupled to the electronic processor 203 and is configured to store instructions that are accessed & executed by the electronic processor 203 to provide the functionality of the windrower controller 201 including, for example, the functionality described herein. The windrower controller 201 is communicatively coupled to various actuators and sensors of the windrower including, for example, a steering system 207, one or more cutter lift actuators/sensors 209, a tractor vehicle speed sensor 211, and a cutter speed sensor 213. The windrower controller 201 is also communicatively coupled to a positioning system 215 such as, for example, a GPS configured to determine a position of the windrower.

Similarly, a combine harvester controller 221 also includes an electronic processor 223 and a non-transitory computer-readable memory 225. The memory 225 is communicatively coupled to the electronic processor 223 and is configured to store instructions that are accessed & executed by the electronic processor 203 to provide the functionality of the combine harvester controller 221 including, for example, the functionality described herein. The combine harvester controller 221 is communicatively coupled to various actuators and sensors of the combine harvester including, for example, a steering system 227, one or more belt pick-up actuators 229 (e.g., for moving collected crop along a belt to a collection receptacle), and one or more drive train/vehicle speed actuators 231 (e.g., for controlling and adjusting a ground speed of the combine harvester). The combine harvester controller 221 is also communicatively coupled to a positioning system 233 such as, for example, a GPS configured to determine a position of the combine harvester.

In various implementations, the windrower controller 201 may be configured to operate the windrower by generating control signals to the various actuators of the windrower in response to operator inputs received by the windrower controller 201 (e.g., from the operator controls positioned within the operator cab 20). Similarly, the combine harvester controller 221 may be configured to operate the combine harvester by generating control signals to the various actuators of the combine harvester based on operator inputs received by the combine harvester controller 221. In some implementations, the windrower controller 201 and/or the combine harvester controller 221 may also be configured to provide autonomous and/or semi-autonomous operation of the windrower/combine harvester instead of or in addition to the manual operation. In some implementations, the windrower controller 201 and/or the combine harvester controller 221 may be configured to provide autonomous and/or semi-autonomous operation in response to output data received from one or more sensors, image data captured by a camera system (not pictured), radar data from a radar system of the machine (not pictured), and/or a pre-determined path plan for moving the windrower/combine harvester through the field.

Additionally, in some implementations (as discussed further in the example below), the combine harvester controller 221 may be configured to receive data indicative of the operation of the windrower and to use that received data to provide autonomous/semi-autonomous operation of the combine harvester and/or to provide guidance/assistance to an operator of the combine harvester. Accordingly, in some implementations (particularly implementations configured manual or semi-autonomous operation of the combine harvester), the combine harvester controller 221 is communicatively coupled to one or more operator controls 237 such as, for example, a steering wheel, control levers, joysticks, control pedals, control buttons, and/or other input devices and is configured to generate control signals to one or more of the actuators in response to inputs received from the operator controls. Similarly, in some implementations, the combine harvester controller 221 is also communicatively coupled to a display screen 239 and is configured to display information such as, for example, information regarding the current harvesting operation, a path plan for the harvesting operation, and/or information regarding the windrowing operation performed previously in the same field.

In the example of FIG. 2, the windrower controller 201 is communicative coupled to a transceiver 217 of the windrower and the combine harvester controller 221 is communicatively coupled to a transceiver 235 of the combine harvester. In some implementations, the windrower controller 201 is configured to communicate directly with the combine harvester controller 221 by transmitting data from the transceiver 217 to the transceiver 235 (e.g., through a wireless or wired communication mechanism). In other implementations, the windrower controller 201 is configured to transmit collected data via the transceiver 217 to a remote server 241 and the data is then transmitted from the remote server 241 to the transceiver 235 of the combine harvester.

In some implementations, the windrower controller 201 is configured to periodically determine a position of the windrower and to collect other information indicative of the operation of the windrower as it moves through the field. For example, in some implementations, the windrower controller 201 is configured to periodically collect a GPS position, a ground speed, a cutter bar height, and a cutter bar speed at each sampling interval and to store the collected data to the memory 205. For example, FIG. 3 illustrates a field with three swaths 301, 303, 305 of crop cut by a windrower. As discussed above, the windrower controller 201 periodically determined the GPS position of the windrower as it moved through the field and has stored at least 3 GPS positions 307, 309, 311 in the first swath 301. Based on this series of GPS position data, the windrower controller 201, the remote server 241, and/or the combine harvester controller 221 can estimate a centerline 313 of the first swath. Additionally, because the series of GPS position data points are acquired and stored sequentially, the windrower controller 201, the remote server 241, and/or the combine harvester controller 221 can also determine a direction travelled by the windrower while cutting each swath. For example, as illustrated in FIG. 3, it can be determined that the windrower was moving in a first direction 315 when cutting the second swath 303 and was moving in an opposite direction 317 when cutting the third swath 305.

Accordingly, the operating data collected and stored by the windrower controller 201 is transformed into a data format that is usable by the combine harvester. As discussed further in the examples below, in some implementations, the operating data from the windrower is used, for example, to generate a path plan (defining a route to be followed by the combine harvester when collecting the cut crops from the field), and/or a windrow map (defining the location and orientation of each swath in the field). In some implementation, the windrower controller 201 is configured to perform this data processing and to transmit a data stream that is already in a format usable by the combine harvester. In other implementations, the windrower controller 201 is configured to transmit a data stream of raw data to the combine harvester controller 221 (either directly or through the remote server 241) and the combine harvester controller 221 is configured to process the stream of raw data in order to generate the usable data for guiding the operation of the combine harvester. In still other implementations, the remote server 241 is be configured to receive the raw data from the windrower controller 201, transform the raw data stream into a data format usable by the combine harvester, and then transmit the transformed data to the combine harvester controller 221.

Although the example of FIG. 2 illustrate either direct communication between the windrower controller 201 & the combine harvester controller 221 (via transceivers 217, 235) or indirect communication through a remote server 241, in some implementations other mechanism may be utilized for facilitating the transfer of data and/or for transforming the raw windrower data stream into the data format usable by the combine harvester. For example, in some implementations, the windrower controller 201 may be configured to transmit either the raw data stream or the transformed data format to a cloud-computing system where it is then later accessed by the combine harvester controller 221. Alternatively or additionally, in some implementations, the remote server 241 in FIG. 2 may be replaced by a personal computing device (e.g., a laptop computer, a smart phone, or a tablet computer) configured to transfer data between the windrower controller 201 & the combine harvester controller 221 and/or to transform the stream of raw data from the windrower controller 201 into the data format usable by the combine harvester controller 221. In still other implementations, the windrower controller 201 and the combine harvester controller 221 may each be configured to be communicatively coupled with a storage device (e.g. a thumb drive) that is first coupled to the windrower controller 201 to receive the data and is then coupled to the combine harvester controller 221 to transfer the data.

Figure 4:
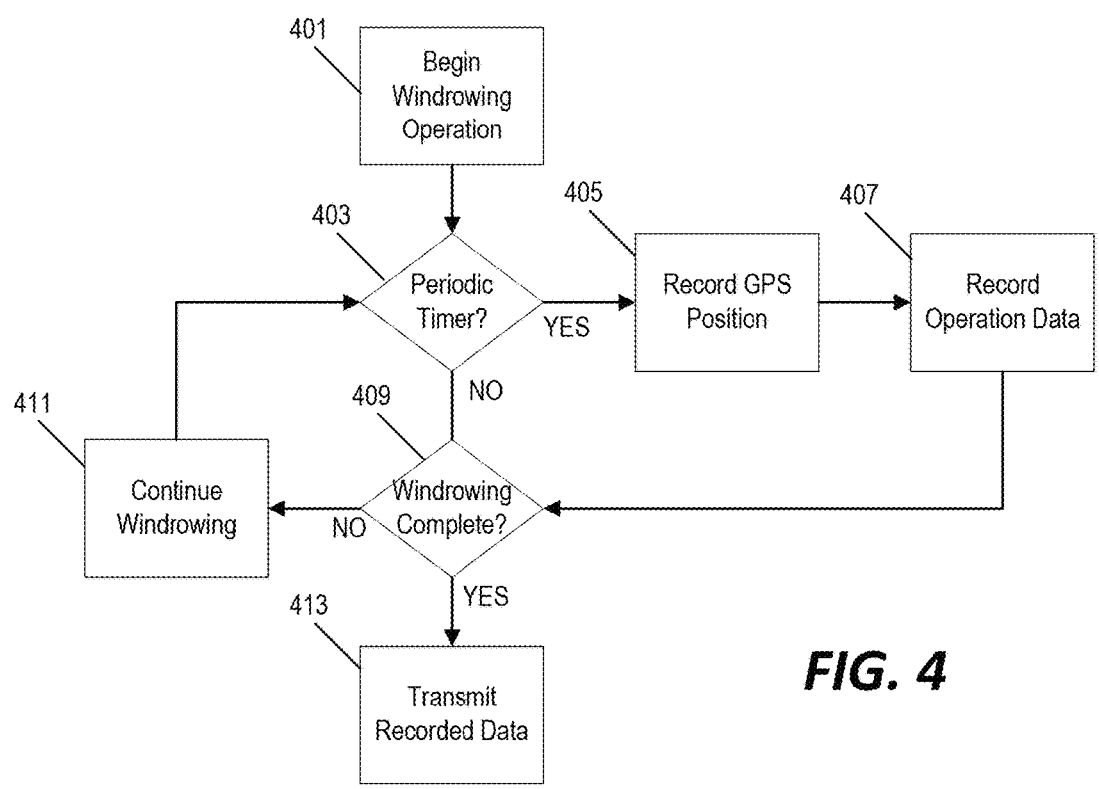
FIG. 4 is a flowchart of a method for recording operating data using the control system of FIG. 2 while operating the windrower of FIG. 1.

FIG. 4 illustrates an example of a method performed by the windrower controller 201 for generating the data stream described above. After the windrowing operation begins (step 401), the windrower controller 201 monitors a periodic timer (step 403) and, at a defined sampling frequency, records the current GPS position of the windrower (step 405) and records other operation data (step 407) (e.g., the ground speed of the windrower, the height of the cutter bar, and/or the cutter bar speed). The recorded data is stored to the memory 205 of the windrower controller 201 and, as the windrowing operation continues (step 411), new updated data is recorded at the sampling frequency upon each expiration of the periodic timer (step 403). In the example of FIG. 4, when the windrowing operation is complete (step 409), the stored recorded data is then transmitted to the remote server 241 or to the combine harvester controller 221 (step 413). However, as noted above, in other implementations, the windrower controller 201 may be configured to process and transform the recorded data stream into a data format usable by the combine harvester before transmitting the new transformed data to the remote server 241 or the combine harvester controller 221. Although, in the example of FIG. 4 the windrower controller 201 is configured to transmit the recorded data after completing the windrowing operation, in some implementations, the windrower controller 201 is configured to transmit the recorded data throughout the windrowing operation. For example, in some implementations, the windrower controller 201 may be configured to periodically transmit new raw data each time a new GPS position and other operation data is recorded.

Figure 5:
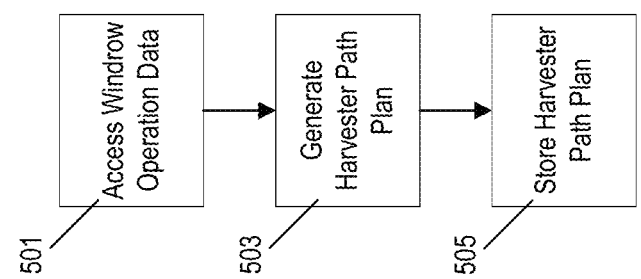
FIG. 5 is a flowchart of a method for converting stored operational data from the method of FIG. 4 into harvester path plan data useable by a combine harvester.

FIG. 5 illustrates an example of a method for transforming the raw data collected by the windrower controller 201 into a data format usable by the combine harvester. In the example of FIG. 5, the recorded windrow operation data is accessed (step 501) and a harvester path plan is automatically generated (step 503). A harvester path plan includes a defined route to be travelled by the combine harvester while harvesting the windrowed crops. As also discussed above, in some implementations, the harvester path plan is generated by first determining a location/centerline and windrower heading for each swath (e.g., as illustrated in FIG. 3) and then determining a path plan for the combine harvester that causes the combine harvester to follow each swath in a preferred direction. Based on the raw data collected by the windrower, the path plan may also define, in some implementations, variations in ground speed, cutter bar height, and cutter bar speed to be applied at different times and/or locations as the combine harvester follows the route defined by the path plan.

As discussed above in reference to FIG. 2, in various different implementations, the data transformation performed in the method of FIG. 5 may be performed by various different computing systems and/or devices. For example, in some implementations, be performed by a remote computer server 241 that is configured to receive raw data from the windrower controller 201 and to then transmit the path plan data to the combine harvester controller 221. In other implementations, the windrower controller 201 itself might be configured to implement the method of FIG. 5 to generate the path plan data for a combine harvester before transmitting any data to the remote server 241 or to the combine harvester controller 221. Finally, in still other implementations, the combine harvester controller 221 may be configured to receive the raw windrower data and to automatically generate the path plan according to the method of FIG. 5.

Figure 6:
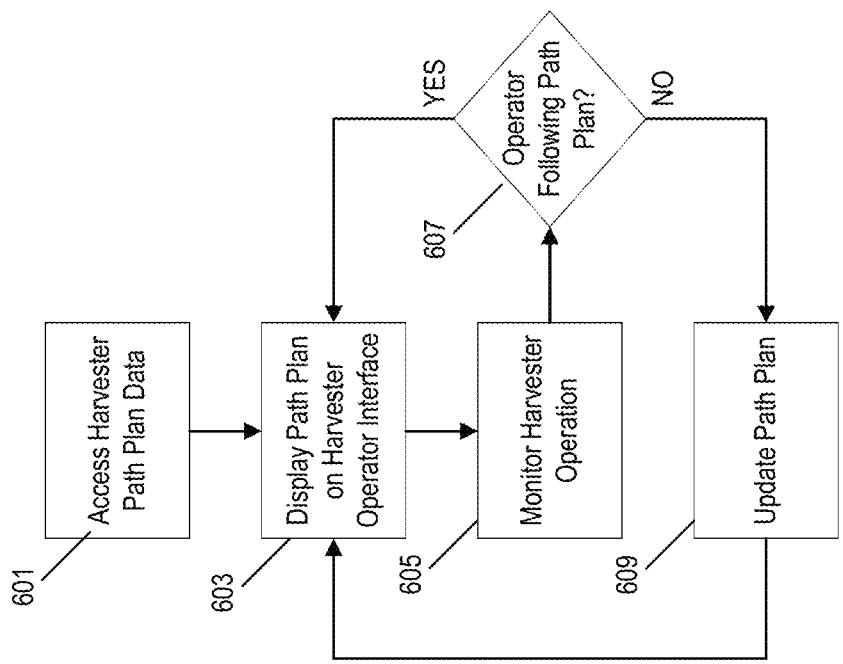
FIG. 6 is a flowchart of a method for providing operator assistance to an operator of a combine harvester based on the harvester path plan data generated by the method of FIG. 5.

As also discussed above, the systems illustrated in FIG. 2 may be configured to facilitate manual operation of the combine harvester, autonomous operation of the combine harvester, and/or semi-autonomous operation of the combine harvester. FIGS. 6 though 8 illustrate different examples of methods implemented by the combine harvester controller 221 for manual operation (FIG. 6), autonomous operation (FIG. 7), and semi-autonomous operation (FIG. 8). These are only three examples and the specific methods for operating the combine harvester and/or for providing guidance and assistance to an operator of the combine harvester based on the raw data stream collected by the windrower may vary in other implementations. For example, in some implementations, certain steps described above in reference to manual operation of the combine harvester may be included in mechanisms for autonomous or semi-autonomous operation of the combiner harvester.

In the example of FIG. 6, the combine harvester controller 221 is configured to use the data collected by the windrower (or, for example, the harvester path plan generated in the example of FIG. 5) to provide guidance and assistance to a manual operator of the combine harvester. The combine harvester controller 221 accesses the harvester path plan data (e.g., from the memory 225, from the remote server 241, and/or from the windrower controller 201) (step 601) and displays information associated with the path plan on an operator interface screen within an operator cab of the combine harvester (step 603). In some implementations, the information displayed on the operator interface screen may include data similar to the example of FIG. 3 in which the centerline for each of a plurality of swaths are displayed along with an indication of the direction to be followed by the combine harvester along each swath.

The combine harvester controller 221 then continues to monitor the operation of the combine harvester (step 605) including, for example, periodically monitoring the GPS position, heading, and ground speed of the combine harvester as well as other actuator settings in order to determine whether the operator of the combine harvester is following the defined path plan (step 607). When the combine harvester controller 221 determines that the operator's manual operation of the combine harvester has deviated from the defined path plan (step 607), the combine harvester controller 221 updates the path plan (step 609) based, for example, on the current position of the combine harvester and the previous operation (e.g., route, speed, heading, & actuator settings) used by the combine harvester during the current harvesting operation. In this way, the path plan is updated to recommend an optimized path plan for completing the current harvesting operation.

Although, in the example of FIG. 6, the combiner harvester controller 221 is configured to update the path plan, in some implementations, the combine harvester controller 221 may instead be configured to transmit a stream of raw data indicative of the operation of the combine harvester to the remote computer server 241 and the remote computer server 241 is configured to update the path plan for the combine harvester based on the raw data stream from the combine harvester controller 221 and transmit the updated path plan back to the combiner harvester controller 221.

Figure 7:
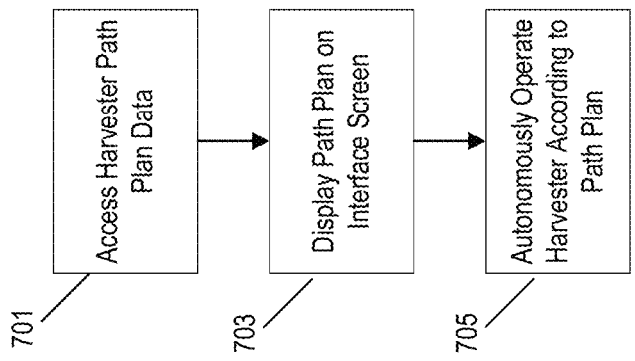
FIG. 7 is a flowchart of a method for autonomously operating a combine harvester based on the harvester path plan data generated by the method of FIG. 5.
Figure 8:
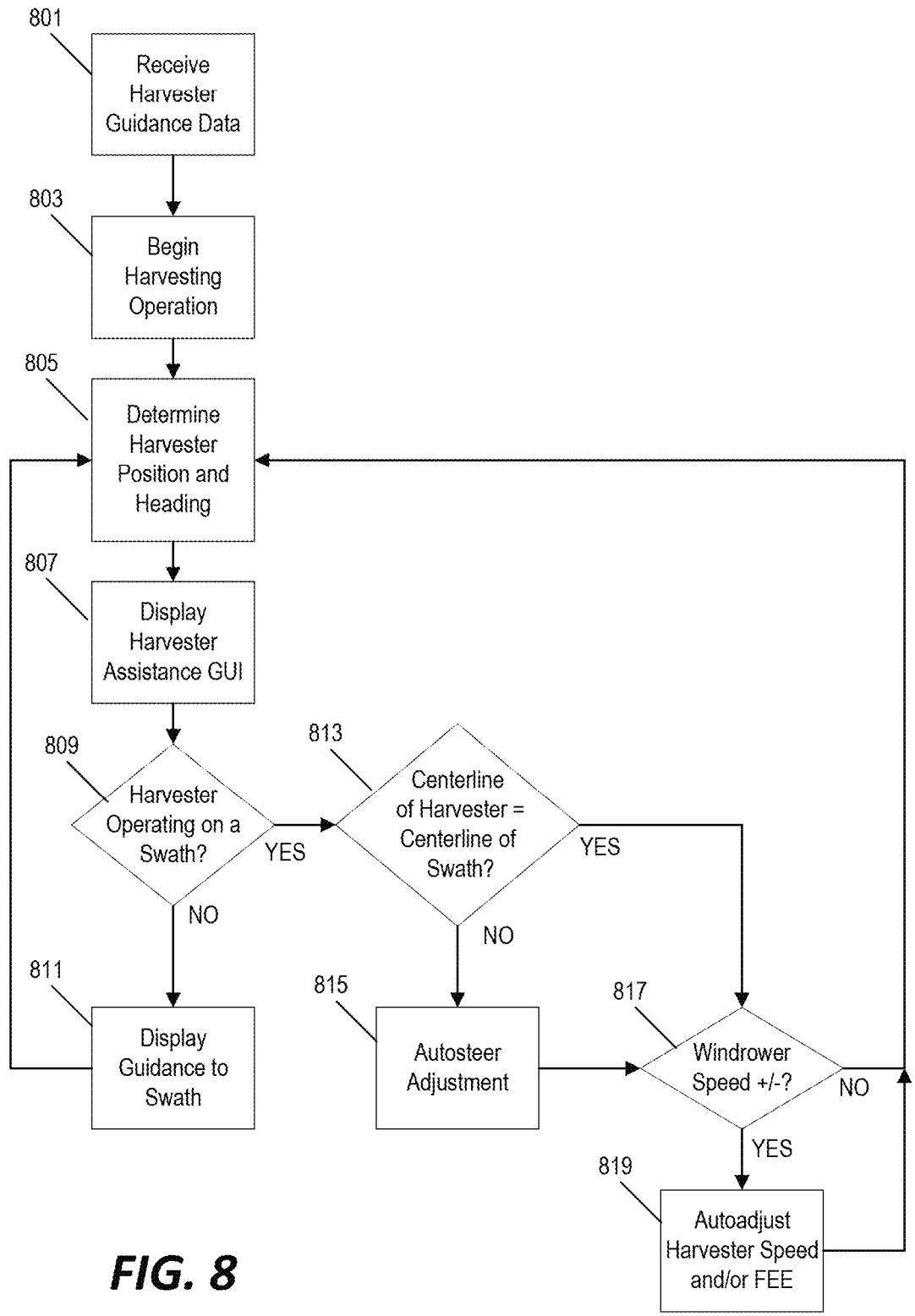
FIG. 8 is a flowchart of a method for semi-autonomous operation of a combine harvester based on the harvester path plan data generated by the method of FIG. 5.

In the example of FIG. 7, the combine harvester controller 221 is configured to perform the harvesting operation completely autonomously based on the path plan generated by the method of FIG. 5. The combine harvester controller 221 accesses the path plan data (step 701) and autonomously controls the operation of the combine harvester based on the path plan including adjusting the steering, ground speed control, and other actuator settings of the combine harvester (step 705). In some implementations, the combine harvester controller 221 may be configured to display path plan information and progress of the combine harvester in performing the harvesting operation on a display screen during the harvesting operation. In some implementations, the graphical information is displayed on a display screen located within an operator cab of the combine harvester and, in some implementations, the graphical information is displayed on a remotely located display screen (e.g., located at a facility where an operator monitors one or more autonomous machines).

In the example of FIG. 8, the combine harvester controller 221 is configured to provide semi-autonomous operation of the combine harvester during a harvesting operation. In particular, in this example, the operator of the combine harvester controls the driving/movement of the combine harvester from one swath to another and, once the combine harvester begins operating along a particular swath, the combine harvester controller 221 provides auto-steering assistance to ensure that a combine harvester follows the centerline of each swath (within a defined tolerance) and also provides auto-adjustments to other actuator settings including, for example, ground speed and front-end equipment actuators. Before beginning the harvesting operation (step 803), the combine harvester controller 221 receives the harvester guidance data generated based on the raw data stream from the windrower (e.g., the path plan generated in the example of FIG. 5) (step 801). The combine harvester controller 221 then determines a current position and heading of the combine harvester (step 805) while displaying harvester assistance information (e.g., the windrow map and/or path plan as illustrated in the example of FIG. 3) on a display screen within the operator cab of the combine harvester (step 807).

Based on the path plan data and the determined current position/heading of the combine harvester, the combine harvester controller 221 determines whether the combine harvester is currently collecting crop by following a swath (step 809). If the combine harvester controller 221 determines that the combine harvester is not already operating along a swath, then the combine harvester controller 221 displays guidance to the operator (e.g., graphically on the display screen in the operator cab) instructing the operator to move towards a recommended swath to be collected next (step 811). In some implementations, the combine harvester controller 221 is configured to determine a recommended swath by identifying the swath that can be collected in the preferred collection heading with a starting point nearest to the current GPS position of the combine harvester. In some implementations, the guidance displayed on the screen may include a visual identification of the recommend swath and instructions (e.g., step-by-step driving directions) for moving the combine harvester to the starting point (e.g., an end of the swath) from the current GPS position of the combine harvester.

Once the combine harvester controller 221 determines that the combine harvester is operating along a swath, the combine harvester controller 221 compares a current position GPS position of the combine harvester to the position of the centerline of the current swath (step 813) and provides automatic steering adjustments (step 815) to ensure that the travel of the combine harvester is properly centered along the centerline of the swath as determined by the raw data collected by the windrower. Additionally, as noted above, the windrower may be operated to decrease its ground speed when the density of crops increases and to increase its ground speed in sections with a lower crop density. Accordingly, the path plan (and thereby the combine harvester controller 221) can estimate a density of cut crops at locations along each swath based in part on the recorded ground speed of the windrower at those locations. Therefore, in the example of FIG. 8, the combine harvester controller 221 is configured to identify deviations in windrower speed (step 817) and to automatically adjust the ground speed of the combine harvester and/or the front end equipment ("FEE") actuators in order to more appropriately collect larger/small relative densities of crops in the current swath.

When the combine harvester finishes harvesting a particular swath, the combine harvester controller 221 determines that the combine harvester is no longer operating along a swath (step 809) and displays guidance directing the operator of the combine harvester to the next recommend swath. This is repeated until all of the cut crops in the field have been collected by the combine harvester.

In some implementations, the systems and methods described in the examples above are configured to collect and store data from a windrowing operating that will then serve as input data for a combine harvester. The collected data may include, for example, a windrow centerline (e.g., determined based on GPS position), a windrower heading during the cutting operation (used to determine the direction of the material as it lies in the swath (e.g., swath orientation)), windrower speed, and lift position of the windrower header. This collected data is then passed to the combine harvester to be used as a technology feature to assist an operator of the combine harvester and/or to provide the ability for the combine harvester to operate autonomously (or semi-autonomously) when harvesting the windrows. In some implementations, this mechanism enables harvester autonomy for windrowed crop when an operator is not present in the operator cab of the combine harvester. In some implementations, this mechanism increases harvester productivity by providing the machine an optimized field traverse path that ensures the windrowed swath is always being fed into the machine in the preferred direction and feeding becomes more consistent as centerline guidance enables autosteer (as discussed further below) to ensure feeding is always centered on the belt pick-up ("BPU"). In some implementations, this mechanism creates an additional data stream between work operations in the small grain production system for the customer and the equipment manufacturer to use to make operational decisions. Finally, without this mechanism, an operator of the combine harvester may be required to visually determine the crop orientation in each swath and plan a field path (i.e., a path plan) accordingly to keep the combine harvester feeding in the desired direction. The operator must also be vigilant in making steering adjustments to keep the belt pick-up ("BPU") of the combine harvester centered on the middle of the swath to ensure even feeding. This requires an experienced operator with a sharp skillset to maximize productivity of the combine harvester operation. Accordingly, in some implementations, this mechanism ensures that a harvesting operation can be completed with greater precision and predictability even when the combine harvester is operated by a less experienced/skilled operator.

Additionally, although the examples described above focus specifically on using operational data collected by a windrower to guide the later operation of a combine harvester, in some implementations, the systems and methods described above may be adapted to other combinations of machinery where data collected indicating the operation of one machine is then transformed into data usable by the other machine.

What is claimed is:

1. A system for providing machine guidance to a combine harvester for a harvesting operation, the system comprising:
   an electronic controller configured to:
   receive an input data stream from a windrower, wherein the input data stream includes a chronologically ordered series of location points, wherein each location point is indicative of a location of the windrower at different times during performance of a windrowing operation in a field;

identify a plurality of data points from the input data stream corresponding to a first window of crops cut by the windrower and left in the field during the windrowing operation;

determine, based on the plurality of data points, a centerline of the first windrow;

generate a path plan for the combine harvester based at least in part on the centerline of the first windrow, wherein the path plan includes an indication of a target route to be travelled by the combine harvester while harvesting the cut crops in the first windrow, wherein the path plan aligns the combine harvester to the centerline of the first windrow; and control the combine harvester to perform the harvesting operation based at least in part on a generated path plan.

2. The system of claim 1, wherein the electronic controller is further configured to determine, based on the plurality of data points, a windrower heading for the first windrow, wherein the windrower heading is indicative of a direction of travel of the windrower while cutting the crops in the first windrow, and wherein the electronic controller is configured to generate the path plan for the combine harvester based at least in part on the centerline of the first windrow and the windrower heading for the first windrow.

3. The system of claim 1, wherein the input data stream from the windrower further includes data indicative of a ground speed of the windrower, wherein the electronic controller is further configured to estimate variations in crop density along the first windrow based on variations in the ground speed of the windrower along the first windrow, and wherein the path plan further includes an indication of adjustments to one or more actuators of the combine harvester based on the estimated variations in the crop density along the first windrow.

4. The system of claim 3, wherein the indication of the adjustment to the one or more actuators of the combine harvester includes an indication of an adjustment to a ground speed of the combine harvester based on the estimated variations in the crop density along the first windrow.

5. The system of claim 1, wherein the input data stream from the windrower further includes a chronologically ordered series of ground speed values of the windrower, a chronologically ordered series of cutter bar lift values for the windrower, and a chronologically ordered series of cutter bar speed values for the windrower.

6. The system of claim 5, wherein the location points, the ground speed values, the cutter bar lift values, and the cutter bar speed values in the input data stream are all sampled at a same defined sampling frequency during the windrowing operation.

7. The system of claim 1, further comprising a remote computer including the electronic controller, wherein the electronic controller is further configured to transmit the generated path plan from the remote computer to a combine harvester electronic controller.

8. The system of claim 1, further comprising a combine harvester controller configured to automatically adjust a steering of the combine harvester based on the generated path plan while harvesting the cut crops of the first windrow to automatically align the combine harvester with the centerline of the first windrow as the combine harvester moves along the first windrow.

9. The system of claim 8, wherein the combine harvester includes a belt pick-up unit, and wherein the combine harvester controller is configured to automatically adjust the steering to align the centerline of the first windrow with a center of the belt pick-up unit.

10. The system of claim 1, further comprising a combine harvester controller configured to autonomously control the combine harvester to perform the harvesting operation based at least in part on the generated path plan.

11. The system of claim 1, further comprising a combine harvester controller configured to:

output on a display unit guidance to an operator of the combine harvester based on the generated path plan for the harvesting operation; and update the path plan based on deviations from the generated path plan during operator-controller performance of the harvesting operation.

12. A method of providing machine guidance to a combine harvester for a harvesting operation, the method comprising:

receiving, by an electronic controller, an input data stream from a windrower, wherein the input data stream includes a chronologically ordered series of location points, wherein each location point is indicative of a location of the windrower at different times during performance of a windrowing operation in a field;

identifying, by the electronic controller, a plurality of data points from the input data stream corresponding to a first windrow of crops cut by the windrower and left in the field during the windrowing operation;

determining, by the electronic controller, a centerline of the first windrow based on the plurality of data points;

generating, by the electronic controller, a path plan for the combine harvester based at least in part on the centerline of the first windrow, wherein the path plan includes an indication of a target route to be travelled by the combine harvester while harvesting the cut crops in the first windrow, wherein the path plan aligns the combine harvester to the centerline of the first windrow; and controlling, by the electronic controller, the combine harvester to perform the harvesting operation based at least in part on a generated path plan.

13. The method of claim 12, further comprising determining, based on the plurality of data points, a windrower heading for the first windrow, wherein the windrower heading is indicative of a direction of travel of the windrower while cutting the crops in the first windrow, and wherein generating the path plan for the combine harvester includes generating the path plan based at least in part on the centerline of the first windrow and the windrower heading for the first windrow.

14. The method of claim 12, wherein the input data stream from the windrower further includes data indicative of a ground speed of the windrower, the method further comprising estimating variations in crop density along the first windrow based on variations in the ground speed of the windrower along the first windrow, and wherein the path plan further includes an indication of adjustments to one or more actuators of the combine harvester based on the estimated variations in the crop density along the first windrow.

15. The method of claim 12, wherein the input data stream from the windrower further includes a chronologically ordered series of ground speed values of the windrower, a chronologically ordered series of cutter bar lift values for the windrower, and a chronologically ordered series of cutter bar speed values for the windrower.

16. The method of claim 12, further comprising a remote computer including the electronic controller, wherein the electronic controller is further configured to transmit the generated path plan from the remote computer to a combine harvester electronic controller.

17. The method of claim 12, further comprising automatically adjusting a steering of the combine harvester based on the generated path plan while harvesting the cut crops of the first windrow to automatically align the combine harvester with the centerline of the first windrow as the combine harvester moves along the first windrow.

18. The method of claim 17, wherein the combine harvester includes a belt pick-up unit, and wherein automatically adjusting the steering of the combine harvester includes automatically adjusting the steering to align the centerline of the first windrow with a center of the belt pick-up unit.

19. The method of claim 12, further comprising autonomously controlling the combine harvester to perform the harvesting operation based at least in part on the generated path plan.

20. The method of claim 12, further comprising:
outputting on a display unit guidance to an operator of the combine harvester based on the generated path plan for the harvesting operation; and
updating the path plan based on deviations from the generated path plan during operator- controller performance of the harvesting operation.

* * * * *